(12) United States Patent
Ahn

(10) Patent No.: US 10,189,481 B2
(45) Date of Patent: Jan. 29, 2019

(54) SOCIAL NETWORK SERVICE (SNS) SERVER FOR PROVIDING PROFILE INFORMATION OF MOBILE DEVICE USER

(71) Applicant: HYUNDAI MOTOR COMPANY, Seoul (KR)

(72) Inventor: Geon Guk Ahn, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 14/957,493

(22) Filed: Dec. 2, 2015

(65) Prior Publication Data

US 2017/0048349 A1    Feb. 16, 2017

(30) Foreign Application Priority Data

Aug. 12, 2015    (KR) ........................ 10-2015-0113994

(51) Int. Cl.
| | | |
|---|---|---|
| *G06F 13/00* | (2006.01) | |
| *B60W 40/10* | (2012.01) | |
| *H04W 4/04* | (2009.01) | |
| *H04L 29/08* | (2006.01) | |
| *B60W 40/09* | (2012.01) | |

(52) U.S. Cl.
CPC ............ *B60W 40/10* (2013.01); *H04L 67/12* (2013.01); *H04W 4/046* (2013.01); *B60W 40/09* (2013.01); *B60W 2530/18* (2013.01); *B60W 2540/30* (2013.01); *B60W 2550/402* (2013.01); *H04L 67/22* (2013.01)

(58) Field of Classification Search
CPC ............... H04L 29/08072; H04L 29/06; H04L 29/0809; H04L 29/08117; H04L 67/12; H04L 67/22; G06Q 30/02; G06Q 50/24; G06Q 50/22; G06Q 40/08; G06Q 10/10; G06F 19/322; B60W 40/09; B60W 40/10; B60W 2530/18; B60W 2540/30; B60W 2550/402; H04W 4/046
USPC .............................................. 705/4; 209/219
See application file for complete search history.

(56) References Cited

U.S. PATENT DOCUMENTS

| | | | | |
|---|---|---|---|---|
| 2013/0006674 A1* | 1/2013 | Bowne | ............... | G06Q 10/0639 705/4 |
| 2013/0226397 A1* | 8/2013 | Kuphal | .................. | G06Q 10/08 701/33.2 |
| 2014/0129080 A1* | 5/2014 | Leibowitz | ............. | B60R 16/023 701/33.3 |

(Continued)

FOREIGN PATENT DOCUMENTS

| | | |
|---|---|---|
| JP | H11-272640 A | 10/1999 |
| KR | 2015-0044612 A | 4/2015 |
| KR | 10-2015-0055689 A | 5/2015 |

*Primary Examiner* — Robert B Harrell
(74) *Attorney, Agent, or Firm* — McDermott Will & Emery LLP

(57) ABSTRACT

An apparatus for providing profile information, in which a mobile device is connected to a vehicle device through a first communication network and connected to a profile information providing server through a second communication network, includes a driving information collection unit configured to collect driving information of a vehicle, a driving state determination unit configured to determine a driving state of a mobile device user based on the driving information, and a communication unit configured to transmit a driving state determination result to the profile information providing server.

9 Claims, 6 Drawing Sheets

(56) References Cited

U.S. PATENT DOCUMENTS

| | | | |
|---|---|---|---|
| 2015/0170290 A1* | 6/2015 | Bowne | G06Q 10/0639 705/4 |
| 2015/0356795 A1* | 12/2015 | Warren | G07C 5/008 701/31.5 |
| 2016/0044156 A1* | 2/2016 | Hodges | H04M 1/72577 455/418 |

* cited by examiner

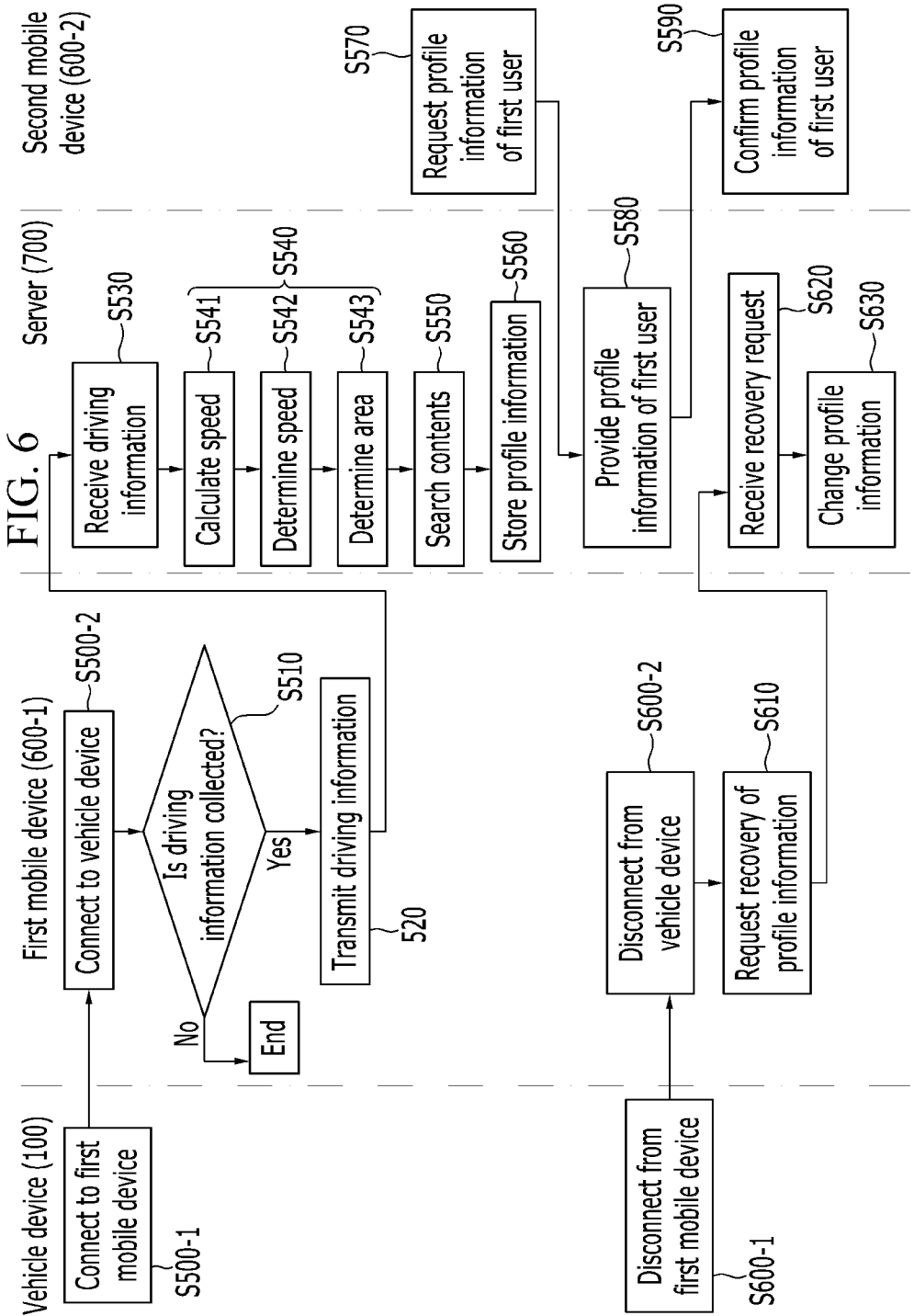

SOCIAL NETWORK SERVICE (SNS) SERVER FOR PROVIDING PROFILE INFORMATION OF MOBILE DEVICE USER

CROSS-REFERENCE TO RELATED APPLICATION

This application claims the benefit of priority to Korean Patent Application No. 10-2015-0113994 filed in the Korean Intellectual Property Office on Aug. 12, 2015, the entire content of which is incorporated herein by reference.

TECHNICAL FIELD

The present disclosure relates to an apparatus and a computer readable recording medium for providing profile information of a social network service, and more particularly, to an apparatus and a computer readable recording medium for providing profile information representing a present state of a social network service while driving.

BACKGROUND

A social network service (SNS) is a service which constructs a relational online network with friends, seniors and juniors, colleagues, etc., and provides information sharing therewith. The SNS has had high utilization as a communication, marketing, and information acquisition means in recent years, and as a result, the number of users using the SNS has rapidly increased.

In the SNS, profile information including status information and propensity information of a user is very important to form and maintain a relationship between users. The user uses pictures, messages, or the like representing a present state, emotions, etc. of the user through mobile devices to generate the profile information. Friends or acquaintances connected to the user through the SNS may recognize the present state or emotions of the user based on the profile information of the user, and may communicate with the user or share the relevant information with the user based thereon.

However, it is not easy for a user who is in situations of driving or the like to change the profile information by searching and editing pictures or messages which represent his/her own present state. Therefore, friends who do not know the present state of the user may feel inconvenient when the user does not respond to their telephones and messages.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus and a computer readable recording medium for providing profile information of a social network service having advantages of representing a driving state of a user using the social network service.

In addition to the above-mentioned object, the exemplary embodiment of the present inventive concept may be used for other objects that are not mentioned in detail.

According to an exemplary embodiment of the present inventive concept, a mobile device connected to a vehicle device through a first communication network and connected to a profile information providing server through a second communication network, includes: a driving information collection unit configured to collect driving information of a vehicle; a driving state determination unit configured to determine a driving state of a mobile device user based on the driving information; and a communication unit configured to transmit a driving state determination result to the profile information providing server.

The mobile device may further include: a contents storage unit configured to store contents representing driving states of the mobile device user; and a contents search unit configured to search a content corresponding to the driving state determination result among the stored contents. The communication unit may transmit the searched contents to the profile information providing server.

The stored contents may include at least one of an image, a picture, a message, music, and a moving image.

The mobile device may include a global positioning system (GPS) module, and the driving information collection unit may use the GPS module to indirectly collect the driving information of the vehicle.

The driving information may include a position, a moving distance, and a moving time of the vehicle, and the driving state determination unit may calculate a vehicle speed based on the moving distance and the moving time and determine the driving state of the mobile device user as one of low speed driving, middle speed driving, high speed driving, or a stop based on the calculated speed.

The driving information collection unit may directly collect the driving information of the vehicle from the vehicle device.

The first communication network may be a wireless local area network.

The second communication network may be a mobile communication network.

According to another exemplary embodiment of the present inventive concept, a computer readable recording medium, in which programs executed by a mobile device connected to a vehicle device through a first communication network and connected to a profile information providing server through a second communication network are stored, t includes: a driving information collection unit configured to collect driving information of a vehicle; a driving state determination unit configured to determine a driving state of a mobile device user based on the driving information; and a communication unit configured to transmit a driving state determination result to the profile information providing server.

The computer readable recording medium may further include: a contents storage unit configured to store contents representing the driving state of the mobile device user; a contents search unit configured to search a content corresponding to the driving state determination result. The communication unit transmits the searched content to the profile information providing server.

According to yet another exemplary embodiment of the present disclosure, a profile information providing server connected to a first mobile device and a second mobile device through a first communication network, includes: a communication unit configured to receive a driving state of the first mobile device user from the first mobile device; and a profile information storage unit configured to store a content corresponding to the received driving state of the first mobile device user as profile information of the first mobile device user and providing the stored profile information to the second mobile device.

The communication unit may receive the content corresponding to the driving state of the first mobile device user from the first mobile device, and the profile information storage unit may store the received content as the profile information of the first mobile device user.

The profile information providing server may further include: a contents storage unit configured to store contents representing driving states of the first mobile device user; and a contents search unit configured to search the content corresponding to the driving state of the first mobile device user. The profile information storage unit stores the searched content as the profile information of the user.

According to still another exemplary embodiment of the present inventive concept, a profile information providing server connected to a first mobile device and a second mobile device through a first communication network, includes a communication unit configured to receive driving information of a vehicle connected to a first mobile device through a second communication network from the first mobile device; a driving state determination unit configured to determine a driving state of the first mobile device user based on the received driving information; a contents storage unit configured to store contents representing driving states of the first mobile device user; a contents search unit searching a content corresponding to the driving state of the first mobile device user; and a profile information storage unit configured to store the searched content as profile information of the first mobile device user and to provide the stored profile information to the second mobile device.

The driving state of the first mobile device user may include speed information of the vehicle.

The driving state of the first mobile device user may include position information of the vehicle.

The driving state of the first mobile device user may include weather information corresponding to a position of the vehicle.

According to the exemplary embodiments of the present inventive concept, it is possible to automatically change the profile information of the user using the social network service while driving, and represent the present state of the user based on the profile information. Further, it is possible for acquaintances connected to the user through the social network service to determine the present state and emotions of the user or whether the acquaintances may contact the user based on the profile information.

BRIEF DESCRIPTION OF THE DRAWINGS

FIG. 6 is a diagram illustrating a method for providing profile information using the apparatus for providing profile information of FIG. 5.

DETAILED DESCRIPTION OF THE EMBODIMENTS

Figure 1:
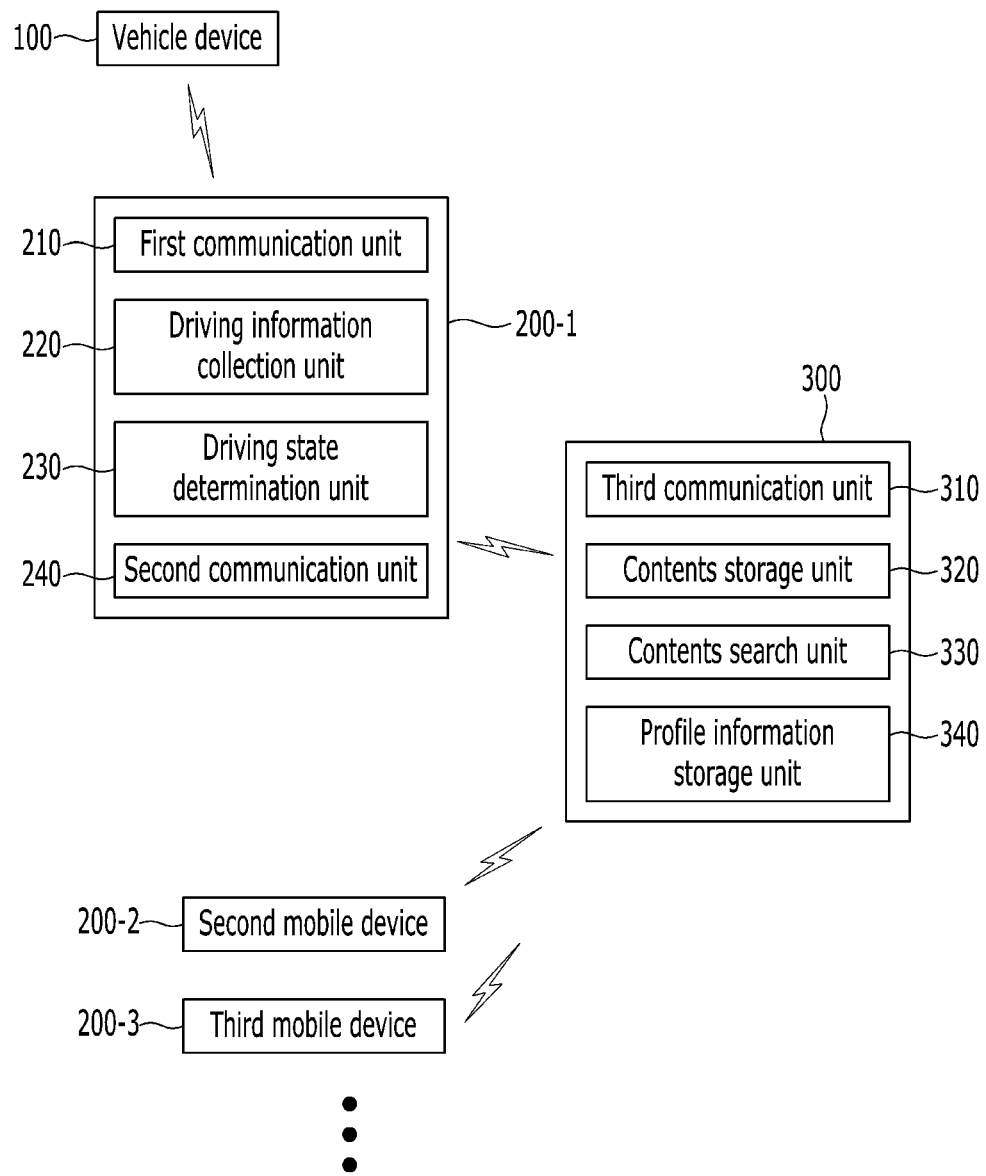
FIG. 1 is a diagram illustrating a configuration of an apparatus for providing profile information according to an exemplary embodiment of the present inventive concept.

Hereinafter, exemplary embodiments of the present inventive concept will be described in detail with reference to the accompanying drawings so as to be easily practiced by a person skilled in the art to which the present disclosure pertains. As those skilled in the art would realize, the described embodiments may be modified in various different ways, all without departing from the spirit or scope of the present disclosure. In order to clearly describe the present disclosure, portions that are not connected with the description will be omitted. Like reference numerals designate like elements throughout the specification. In addition, the detailed description of widely known technologies will be omitted.

In the specification, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function or operation, and can be implemented by hardware components or software components or combinations thereof.

In the specification, a "mobile device" means a portable device which provides data communication and a social network service, and may be connected to a vehicle device in wired communication or wireless communication. For example, the mobile device may include a cellular phone, a personal digital assistant (PDA), a smart phone, a notebook, a wearable device, etc.

FIG. 1 is a diagram illustrating a configuration of a system for providing profile information according to an exemplary embodiment of the present inventive concept.

Referring to FIG. 1, the system includes a first mobile device 200-1 of a first user, a second mobile device 200-2 of a second user connected to the first user through a social network service (SNS), and a third mobile device 200-3 of a third user connected to the first user through the SNS, etc. The first mobile device 200-1 is connected to a vehicle device 100 through a wired and wireless communication network, and is connected to a profile information providing server 300 through the wireless communication network. The vehicle device 100 may include a telematics device or an infotainment device.

The first mobile device 200-1 includes a first communication unit 210, a driving information collection unit 220, a driving state determination unit 230, and a second communication unit 240.

The first communication unit 210 connects the first mobile device 200-1 to the vehicle device 100 through the wireless communication network. When the vehicle device 100 is sensed within a wireless communication coverage of the first mobile device 200-1, the first mobile device 200-1 and the vehicle device 100 are connected to each other through the wireless communication network. The wireless communication network may include wireless local area networks such as BLUETOOTH®, ZigBee, and WI-FI®. Further, the first communication unit 210 may connect the first mobile device 200-1 to the vehicle device 100 through serial wired communication such as USB and RS-232C.

The driving information collection unit 220 determines that the first user gets in a vehicle when the first mobile device 200-1 is connected to the vehicle device 100 through the first communication unit 210, and collects the driving information of the vehicle. According to the present disclosure, a position, a moving distance, and moving time information of the first mobile device 200-1 are collected by using a global positioning system (GPS) module which is installed in the first mobile device 200-1. Since the first mobile device 200-1 is positioned within the wireless communication coverage of the vehicle device 100, it may be considered that the position, the moving distance, and the moving time information of the first mobile device 200-1 are the same as a position, a moving distance, and moving time information of the vehicle. That is, the driving information (position, moving distance, and moving time) of the vehicle may be indirectly collected based on the position, the moving distance, and the moving time information of the first mobile device 200-1.

The driving information collection unit 220 uses the vehicle device 100 to collect the driving information. That is, the driving information may be collected through the GPS module, a navigation module, etc. of the vehicle to directly collect the driving information of the vehicle from the vehicle device 100.

Further, the driving information collection unit 200 may collect weather information for each area transmitted from a remote server.

The driving state determination unit 230 determines a state of the first user based on the driving information collected through the driving information collection unit 220. According to the present disclosure, a vehicle speed is calculated based on a moving distance and a moving time to determine a driving state of the first user as one of low speed driving, middle speed driving, high speed diving, and stop.

The driving state determination unit 230 may determine which town and country the first user is located at based on position information collected through the driving information collection unit 220.

The second communication unit 240 transmits the driving state of the first user determined by the driving state determination unit 230 to the profile information providing server 300 through the wireless communication network. The wireless communication network may include mobile communication networks such as code division multiple access (CDMA) and long term evolution (LTE).

The profile information providing server 300 stores the profile information of the first user and provides the stored profile information to a second user or a third user, and includes a third communication unit 310, a contents storage unit 320, a contents search unit 330, and a profile information storage unit 340.

The profile information providing server 300 may be a social network service (SNS) server.

The third communication unit 310 receives the driving state of the first user transmitted from the first mobile device 200-1.

The contents storage unit 320 may store contents representing the driving state of the first user, and the driving state of the first user may be represented by at least one of the position, the speed, and the weather. The contents may include an image, a picture, a message, music, or a moving image.

The contents search unit 330 searches the contents corresponding to the driving state of the first user.

The profile information storage unit 340 stores the contents searched by the contents search unit 330 as the profile information of the first user.

Figure 2:
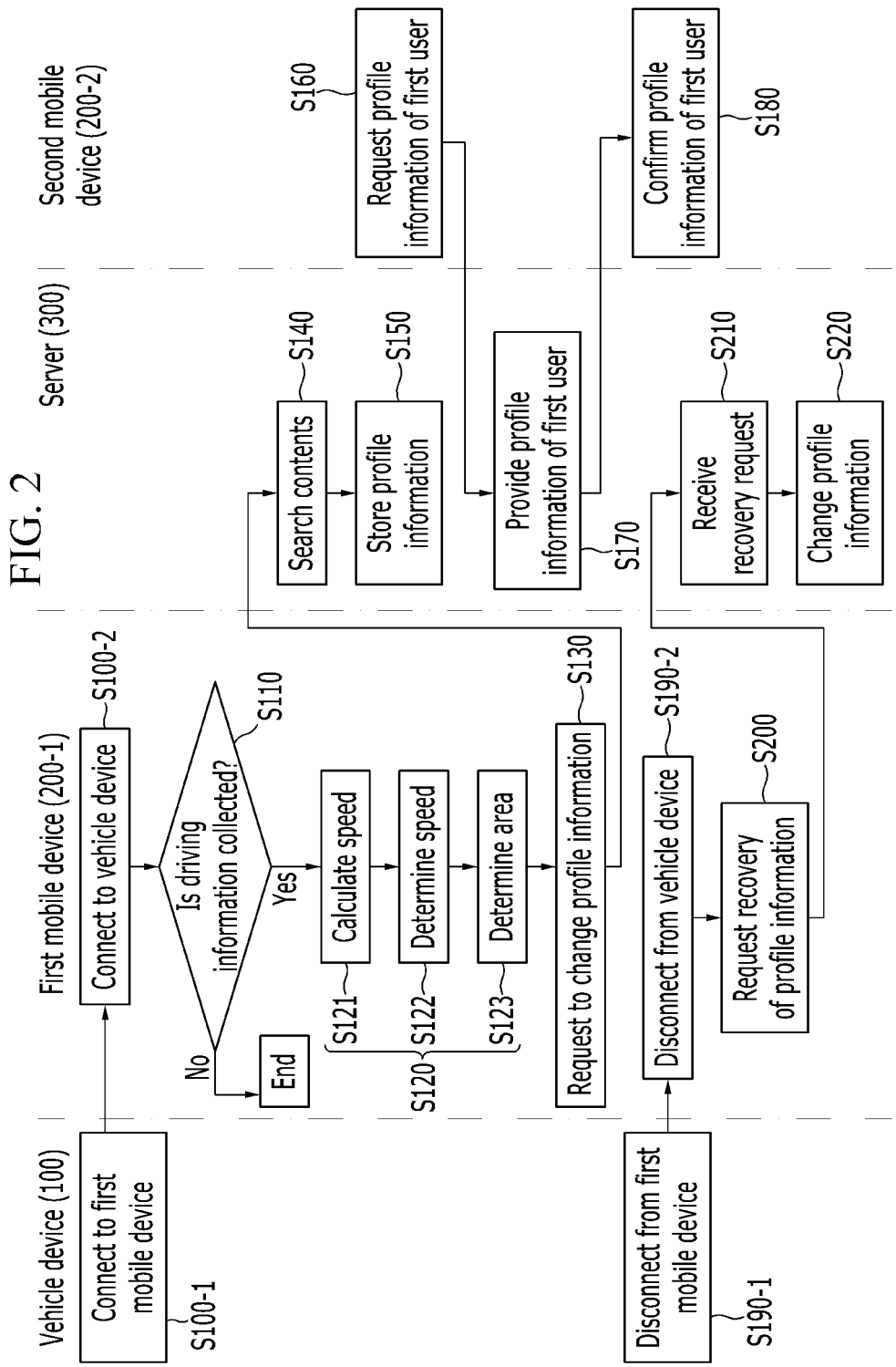
FIG. 2 is a diagram illustrating a method for providing profile information using the apparatus for providing profile information of FIG. 1.

FIG. 2 is a diagram illustrating a method for providing profile information using the apparatus for providing profile information of FIG. 1.

First, the vehicle device 100 and the first mobile device 200-1 are connected to each other by the wireless local area network (S100-1 and S100-2). When the wireless communication functions of the vehicle device 100 and the first mobile device 200-1 are activated and the first mobile device 200-1 is positioned within the wireless communication coverage of the vehicle device 100, the first mobile device 200-1 and the vehicle device 100 are connected to each other through the first communication unit 210.

It is determined that a first user gets in a vehicle when the vehicle device 100 and the first mobile device 200-1 are connected to each other in steps S100-1 and S100-2, and the driving information of the vehicle is collected through the driving information collection unit 220 (S110). Here, the driving information includes a position, a moving distance, and a moving time of the vehicle.

When the driving information is collected in step S110, the driving state determination unit 230 determines a driving state of the first user (S120). In detail, the vehicle speed may be calculated based on the moving distance and the moving time of the vehicle (S121) to determine the driving state as one of low speed driving, middle speed driving, high speed diving, and stop based on the calculated speed (S122). Further, whether the vehicle is driving in the city or country is determined based on the position of the vehicle (S123). In step S123, an area determination result may include weather information of the corresponding area.

If the driving state determination of the first user is completed in step S120, the driving state determination result of the first user is transmitted to the profile information providing server 300 through the second communication unit 240, and the profile information change is requested (S130).

The profile information providing server 300 searches contents corresponding to the driving state of the first user transmitted in step S130, (S140) and stores the searched contents as new profile information of the first user (S150). For example, when the vehicle is in a 'stop state' and the present location of the vehicle is 'country', an ox image standing on paddy field may be searched in step S140. In this case, the 'paddy field' represents a country and the 'standing ox' represents a stop state. Further, when the vehicle is a 'middle speed driving state,' the present area of the vehicle is 'city,' and the weather of the corresponding town is 'rain', a vehicle image passing by a rainy concrete jungle may be searched in S140. In this case, the 'concrete jungle' represents the city, the 'vehicle passing by' represents the middle speed driving state, and the 'rain' represents the weather.

When the second user receives the profile information request of the first user through the second mobile device 200-2 (S160), the profile information providing server 300 provides the profile information of the first user through the second mobile device 200-2 (S170). The second user may confirm a present state, emotion, or whether the second user contacts the first user based on the profile information provided in step S170 (S180). For example, when the 'image of ox standing on paddy field' searched in step S140 is stored as the profile information of the first user, the second user may appreciate that the first user is currently located at the country and does not drive the vehicle. As a result, it may be guessed that the first user has a quiet emotion and it may be appreciated that the first user answers the phone of the second user or is in a response state to a message.

When the driving of the vehicle ends (when a power supply of the vehicle device 100 is turned off), the first mobile device 200-1 and the vehicle device 100 are disconnected from each other (S190-1 and S190-2).

If the communication connection between the first mobile device 200-1 and the vehicle device 100 is disconnected, profile information recovery is requested to the profile information providing server 300 through the second communication unit 240 (S200).

The profile information providing server 300 receives the profile information recovery request transmitted in step S200 (S210), the new profile information stored in step S150 is deleted, and the existing profile information of the first user is stored (S220).

Figure 3:
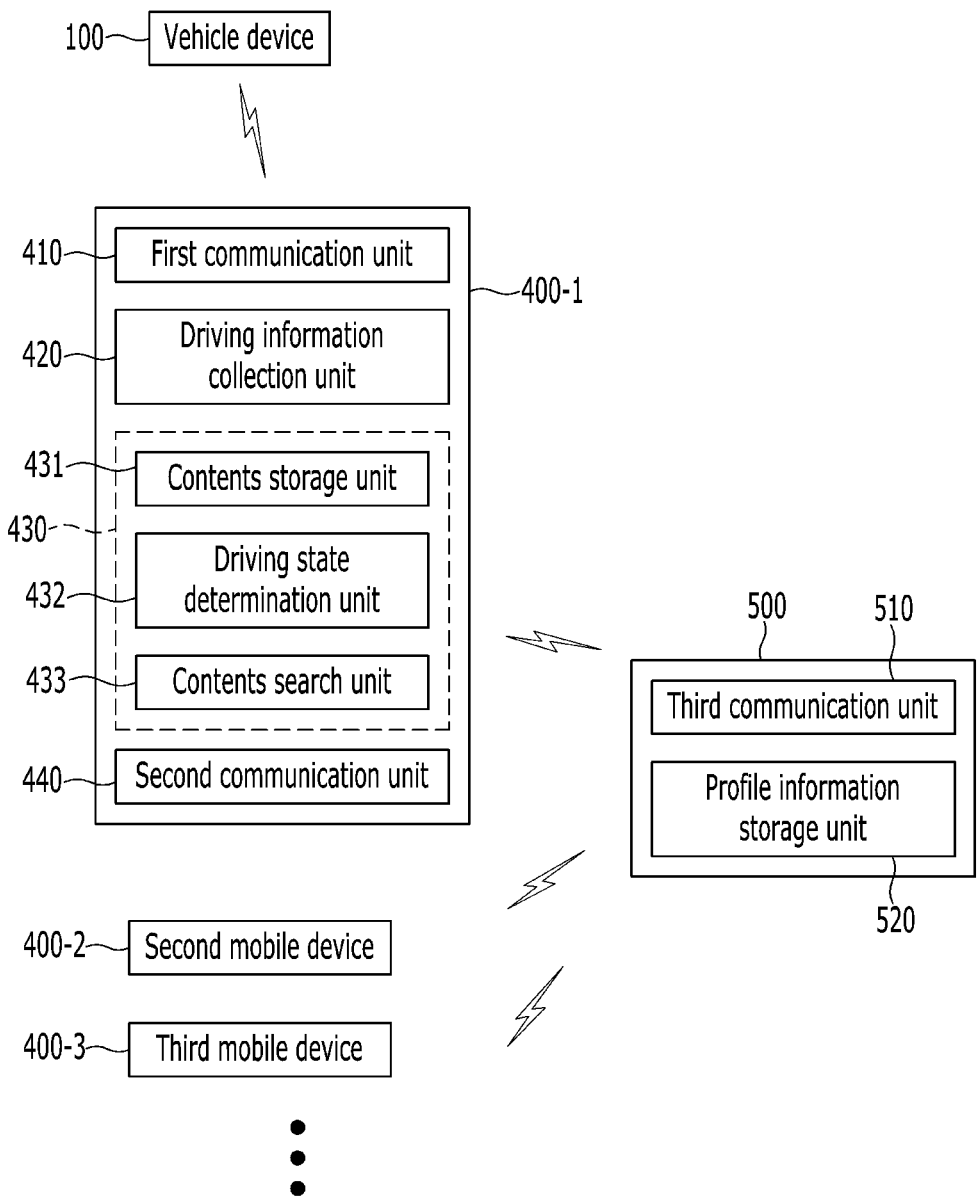
FIG. 3 is a diagram illustrating a configuration of an apparatus for providing profile information according to another exemplary embodiment of the present inventive concept.

FIG. 3 is a diagram illustrating a configuration of an apparatus for providing profile information according to another exemplary embodiment of the present inventive concept.

In FIG. 3, a first mobile device 400-1 includes a first communication unit 410, a driving information collection unit 420, a profile information change request unit 430, and a second communication unit 440.

A profile information providing server 500 includes a third communication unit 510 and a profile information storage unit 520.

Components of the first mobile device 400-1 of FIG. 3 are different from those of the first mobile device 200-1 and the profile information providing server 300 of FIG. 1 in which driving information is collected through the driving information collection unit 420, the driving state of the first user is determined based on the driving information collected through the profile information change request unit 430, and contents corresponding to the driving state of the first user are searched and transmitted to the profile information providing server 500 and a configuration of the profile information providing server 500 stores the contents transmitted from the first mobile device 400-1 as the profile information of the first user through the profile information storage unit 520. However, each component performs substantially the same functions as the components of FIG. 1, and therefore, a description of the overlapping components thereof will be omitted.

Figure 4:
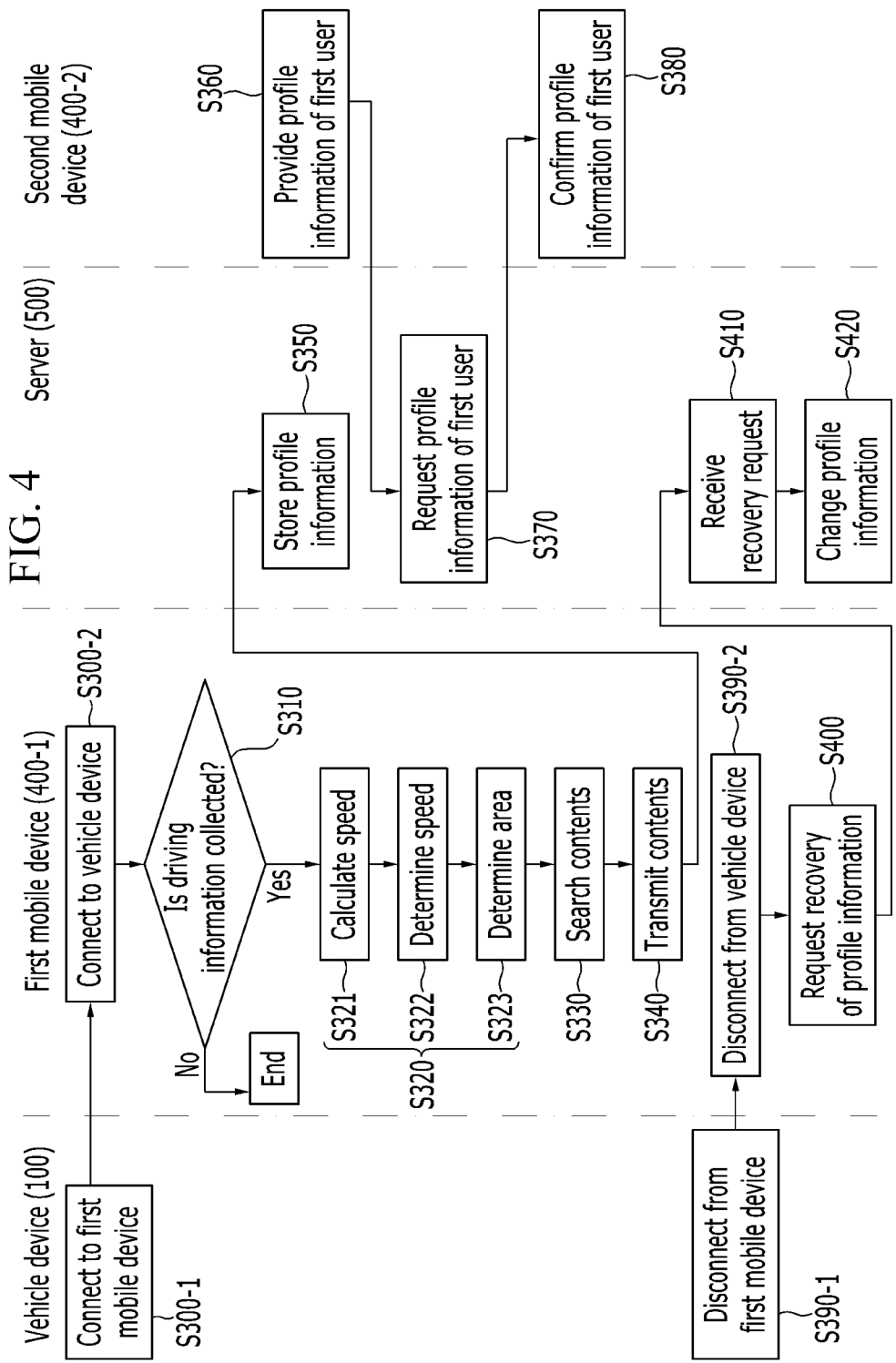
FIG. 4 is a diagram illustrating a method for providing profile information using the apparatus for providing profile information of FIG. 3.

FIG. 4 is a diagram illustrating a method for providing profile information using the apparatus for providing profile information of FIG. 3.

The method for providing profile information of FIG. 4 is different from the method for providing profile information of FIG. 2 in which the first mobile device 400-1 searches the contents corresponding to the driving state determination result in step S320 (S330), the searched contents are transmitted to the profile information providing server 500 (S340), and the profile information providing server 500 stores the contents transmitted in step S340 as the profile information of the first user (S350).

In FIG. 4, steps S300-1 to S320 and steps S360 to S420 are substantially the same as steps S100-1 to S120 and S160 to S220 of FIG. 2, and therefore, a description of the overlapping portions thereof will be omitted.

Figure 5:
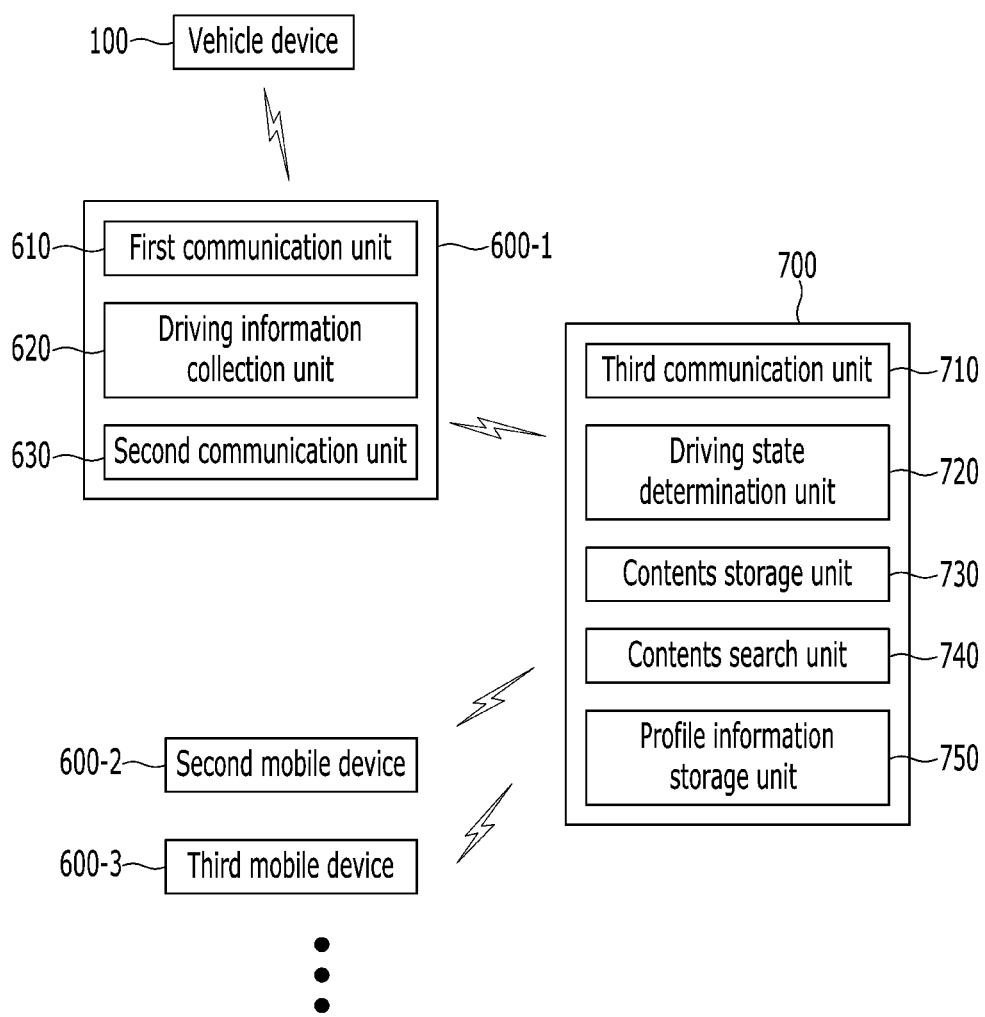
FIG. 5 is a diagram illustrating a configuration of an apparatus for providing profile information according to still another exemplary embodiment of the present inventive concept.

FIG. 5 is a diagram illustrating a configuration of an apparatus for providing profile information according to still another exemplary embodiment of the present inventive concept.

In FIG. 5, a first mobile device 600-1 includes a first communication unit 610, a driving information collection unit 620, and a second communication unit 630.

A profile information providing server 700 includes a third communication unit 710, a driving state determination unit 720, a contents storage unit 730, a contents search unit 740, and a profile information storage unit 750.

Components of the first mobile device 600-1 are different from those of FIGS. 1 and 3 in that the driving information collected through the driving information collection unit 620 is transmitted to the profile information providing server 700, and a configuration of the profile information providing server 700 is different from those of FIGS. 1 and 3 in that the driving state of the first user is determined based on the driving information transmitted from the first mobile device 600-1 through the driving state determination unit 720 and contents corresponding to the driving state of the first user are searched by the contents search unit 740, and the contents searched by the profile information storage unit 750 are stored as the profile information of the first user. However, each component of FIG. 5 performs substantially the same functions as those of FIGS. 1 and 3 and therefore a description of the overlapping components thereof will be omitted.

FIG. 6 is a diagram illustrating a method for providing profile information using the apparatus for providing profile information of FIG. 5.

The method for providing profile information of FIG. 6 is different from the method for providing profile information of FIGS. 2 and 4 in that when the driving information is collected in step S510, the first mobile device 600-1 transmits the collected driving information to the profile information providing server 700 (S520), the profile information providing server 700 receives the driving information transmitted in step S520 (S530), and the driving state of the first user is determined based on the received driving information (S540).

Since steps S500-1 to S510 and steps S550 to S630 of FIG. 6 are substantially the same as steps S100-1 to S110 and steps S140 to S220 of FIG. 2, a description of the overlapping portions thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A social network service (SNS) server connectable to a first mobile device of a first user and a second mobile device of a second user through a communication network, the SNS server storing a first profile information of the first user and providing the first profile information to the second mobile device upon request, the SNS server comprising:
   a communication device configured to receive a driving state of the first user and receive a profile information change request from the first mobile device when the first mobile device is connected to a vehicle device in a vehicle; and
   a processor configured to:
      search a content which represents the driving state of the first user in response to receiving the profile information change request from the first mobile device, the content including at least one of an image, a picture, a message, music, and a moving image;
      store the searched content in a storage as a second profile information of the first user; and provide the stored content to the second mobile device through the communication device upon request from the second mobile device, such that the second user determines a response state of the first user to a phone call or a message without the first user changing a profile information while driving, wherein the processor is further configured to recover the second profile information back to the first profile information which is an original profile information of the first user, in response to receiving a profile information recovery request from the first mobile device through the communication device when the first mobile device is disconnected from the vehicle device.

2. The SNS server of claim 1, wherein
the driving state of the first user represents information including at least one of a location of the vehicle, a speed of the vehicle, and weather in an area corresponding to the location of the vehicle.

3. The SNS server of claim 1, wherein
the communication network is a mobile communication network.

4. A social network service (SNS) server connectable to a first mobile device of a first user and a second mobile device of a second user through a communication network, the SNS server storing a first profile information of the first user and providing the first profile information to the second mobile device upon request, the SNS server comprising:
  a communication device configured to receive driving information of a vehicle connected to a first mobile device from the first mobile device when the first mobile device is connected to a vehicle device in the vehicle; and
  a processor configured to:
    determine a driving state of the first user based on the received driving information;
    search a content representing the driving state of the first user, the content including at least one of an image, a picture, a message, music, and a moving image;
    store the searched content in a storage as a second profile information of the first user; and
    provide the stored content to the second mobile device through the communication device upon request from the second mobile device, such that the second user determines a response state of the first user to a phone call or a message without the first user changing a profile information while driving, wherein the processor is further configured to recover the second profile information back to the first profile information which is an original profile information of the first user, in response to receiving a profile information recovery request from the first mobile device through the communication device when the first mobile device is disconnected from the vehicle device.

5. The SNS server of claim 4, wherein
the driving state of the first user includes speed information of the vehicle.

6. The SNS server of claim 4, wherein
the driving state of the first user includes location information of the vehicle.

7. The SNS server of claim 4, wherein
the driving state of the first user includes weather information corresponding to a position of the vehicle.

8. The SNS server of claim 4, wherein
the driving information includes a position of the first mobile device received from a global positioning system (GPS), and a moving distance and a moving time of the first mobile device, which are the same as a position, a moving distance, and a moving time of the vehicle.

9. The SNS server of claim 4, wherein
the communication network is a mobile communication network.

* * * * *